United States Patent [19]

Kreeger

[11] Patent Number: 4,698,875
[45] Date of Patent: Oct. 13, 1987

[54] DOLLY WITH INTEGRAL STRUCTURE FOR DETACHABLY MOUNTING CASTERS UPON THE DOLLY

[75] Inventor: Elsmer W. Kreeger, Howell, Mich.

[73] Assignee: Pinckney Molded Plastics, Inc., Howell, Mich.

[21] Appl. No.: 850,261

[22] Filed: Apr. 10, 1986

Related U.S. Application Data

[63] Continuation of Ser. No. 720,493, Apr. 5, 1985, abandoned.

[51] Int. Cl.⁴ .............................................. B60B 33/00
[52] U.S. Cl. ......................................... 16/30; 403/348
[58] Field of Search .................... 16/30; 403/348, 349; 280/30, 32

[56] References Cited

U.S. PATENT DOCUMENTS

| | | | |
|---|---|---|---|
| 2,379,984 | 7/1945 | Nereaux | 403/348 X |
| 3,860,209 | 1/1975 | Strecker | 403/348 X |
| 3,879,798 | 4/1975 | Krulwich | 16/30 X |
| 3,987,875 | 10/1976 | Szabo | 16/30 X |
| 4,332,052 | 6/1982 | Remington | 16/30 |
| 4,422,212 | 12/1983 | Sheiman et al. | 16/30 X |

Primary Examiner—Fred Silverberg
Attorney, Agent, or Firm—Basile and Hanlon

[57] ABSTRACT

Casters are detachably mounted upon the underside of the molded plastic frame of a dolly by the use of a single bolt. The caster is provided with a flat, horizontally disposed mounting plate which underlies and bears against a horizontal surface on the bottom of the frame enclosed within a peripheral sidewall integral with and projecting downwardly from the frame. The mounting plate can be vertically moved into face-to-face engagement with the horizontal surface on the frame when in a first angular orientation and then rotated about a vertical axis to a second angular orientation in which webs on the sidewall spaced below the horizontal surface underlie portions of the plate to retain it against vertical separation from the frame. A single bolt detachably retains the plate against rotation from this last position.

1 Claim, 4 Drawing Figures

DOLLY WITH INTEGRAL STRUCTURE FOR DETACHABLY MOUNTING CASTERS UPON THE DOLLY

This application is a continuation of application Ser. No. 720,493, filed Apr. 5, 1985, and now abandoned.

BACKGROUND OF THE INVENTION

The present invention is concerned with apparatus for detachably mounting casters upon dollys or other load-carrying apparatus.

Conventionally, dollys of the type employed by furniture movers consist of a rigid, load-supporting frame having casters whose mounting plates are fixedly secured to the underside of the frame by bolts or lag screws. The casters are the most vulnerable part of the dolly and require frequent replacement. In the usual case, this involves the removal of typically four or more bolts or lag screws in order to remove the faulty caster and the replacement of the same number of bolts or screws to mount the new caster.

This particular type of caster mounting relies upon the tightness of the bolts or screws to hold the caster in a fixed position relative to the frame. The shock loadings encountered by the caster in normal usage tend to progressively loosen the coupling between the caster and the frame, and the looser this coupling becomes, the more vulnerable the caster becomes to damage.

The present invention is directed to an arrangement by which a caster may be positively retained in position upon a dolly frame by means of a single bolt which is in turn subjected to a minimal amount of loading during operation.

SUMMARY OF THE INVENTION

In accordance with the present invention, the underside of the frame of a dolly or other load-supporting frame is formed on its bottom surface with a downwardly facing, horizontal, plate-engaging surface which may be defined by the lower edges of ribs formed on the underside of the frame. The plate-engaging surface has a continuous peripheral sidewall extending around the periphery of the surface and projecting downwardly from the surface. The configuration of this peripheral sidewall is such that it will accommodate, for limited rotation about a vertical axis, a generally rectangular mounting plate of a caster, the caster mounting plate having a horizontal upper surface adapted to be disposed in face-to-face engagement with the plate-engaging surface on the frame. The configuration of the sidewall is such that when the mounting plate is located in a first orientation about a vertical axis relative to the frame, it may be moved vertically into engagement with the plate-engaging surface within the periphery of the sidewalls. When so engaged, the configuration of the sidewalls is such that the mounting plate may be rotated about a vertical axis to a second angular orientation relative to the frame. Horizontal webs are fixedly mounted on the sidewalls at selected locations along its periphery and are arranged so that, when the plate is in the second angular orientation referred to above, the webs underlie portions of the mounting plate, extending generally across three corners of the generally rectangular plate, to retain the plate against vertical separation from the plate-engaging surface on the frame. When in this last position, a single retaining bolt is employed to hold the plate against rotation about the vertical axis relative to the frame.

Thus, as long as the plate is held against rotation relative to the frame, it is trapped by the webs and plate engaging surface against any vertical movement relative to the frame. The retaining bolt is required to resist only relative rotary movement of the plate relative to the frame.

Other objects and features of the invention will become apparent from the following specification and accompanying drawings.

IN THE DRAWINGS

Figure 1:
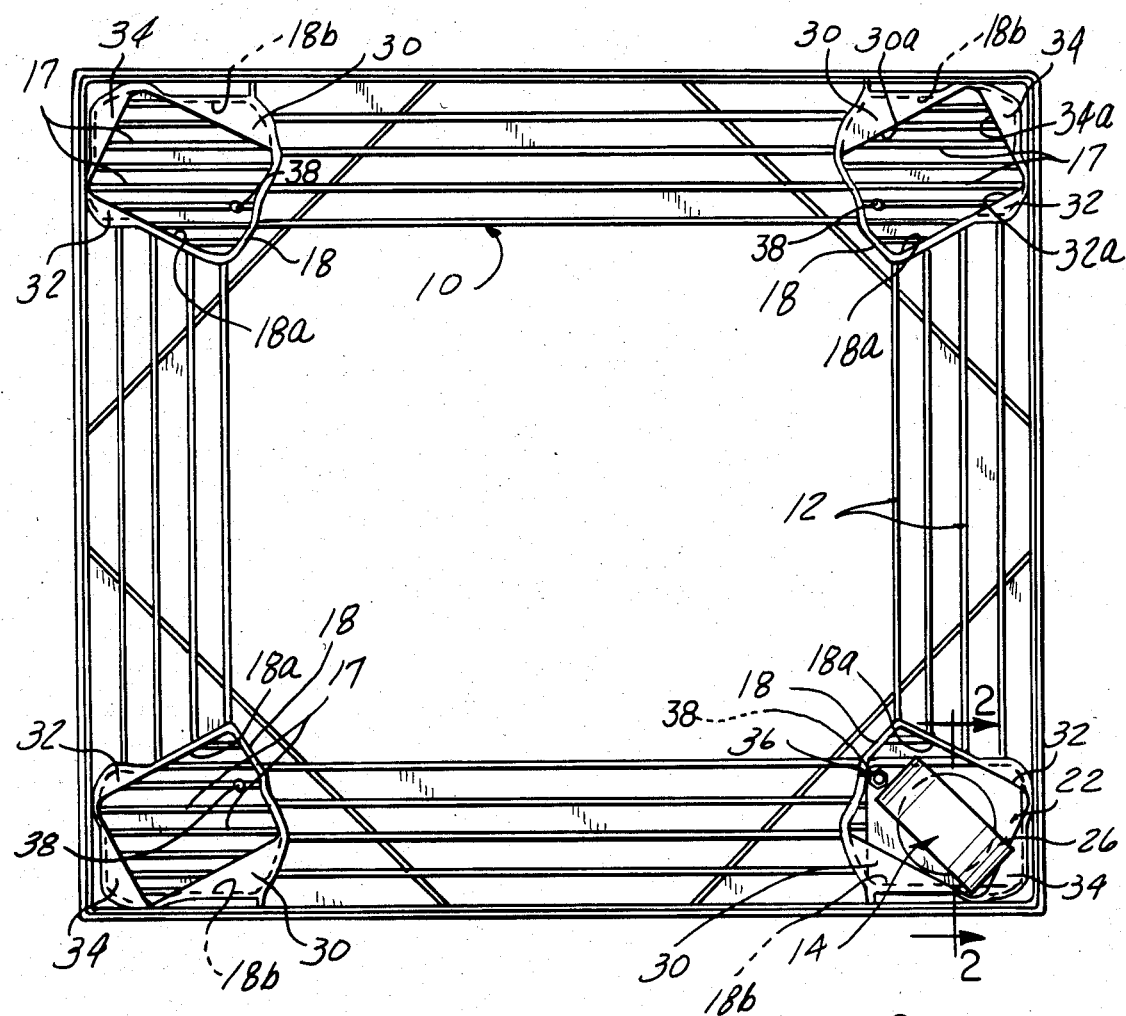
FIG. 1 is a bottom view of a dolly frame constructed in accordance with the present invention.
Figure 2:
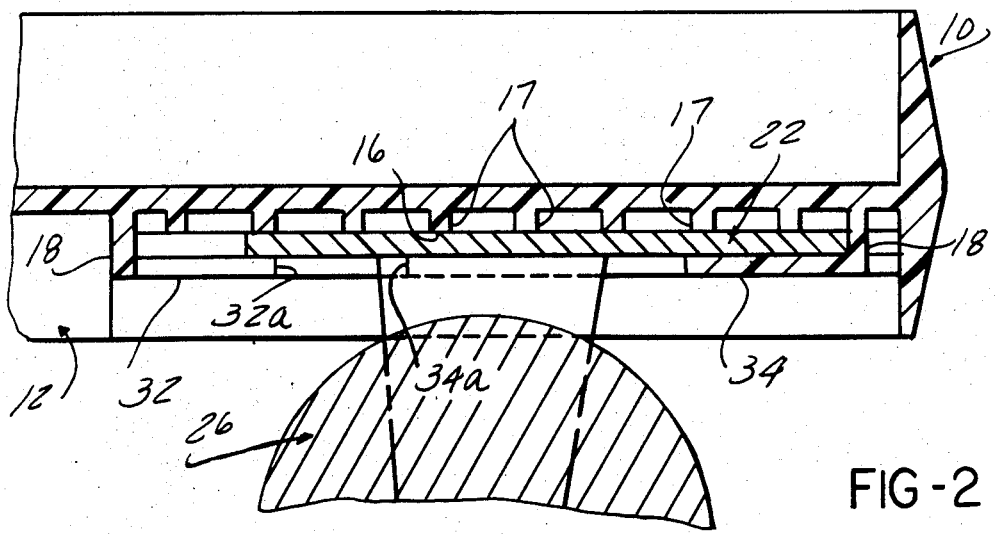
FIG. 2 is a detailed cross-sectional view taken on line 2—2 of FIG. 1.

Referring first to FIG. 1, there is shown a bottom view of a generally rectangular dolly frame designated generally 10 which in the particular example shown may be injection molded from a suitable plastic material and formed with suitably arranged stiffening ribs, such as 12. At the lower right-hand corner of the frame 10, as viewed in FIG. 1, there is shown a caster assembly designated generally 14 assembled to the frame. Casters 14 are intended to be mounted at the remaining corners of frame 10, but are not shown in FIG. 1. The mounting structure for mounting casters to frame 10 is the same at each corner of the frame, and the structure of the frame which forms the mounting means is best seen from FIGS. 1, 2 and 3.

Figure 4:
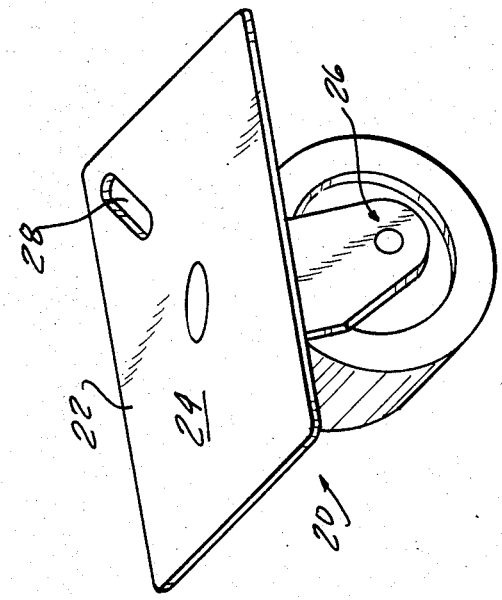
FIG. 4 is a perspective view of a caster provided with a mounting plate embodying the present invention.

At each corner of frame 10, the bottom of the frame is formed with a horizontal plate-engaging surface 16 defined by the lower edges of ribs 17. A downwardly projecting sidewall 18 extends around the entire periphery of each plate-engaging surface 16. The peripheral configuration of sidewall 18, as viewed in FIG. 1, must be conformed in a particular manner to the mounting plate of a caster, for reasons which will become apparent. Referring to FIG. 4, there is shown a caster assembly 20 which includes a generally rectangular mounting plate 22 having a flat, horizontal upper surface 24. A swivel caster wheel designated generally 26 is mounted in a conventional manner to mounting plate 22. A relatively short, diagonally extending slot 28 is cut through the plate adjacent one corner.

Figure 3:
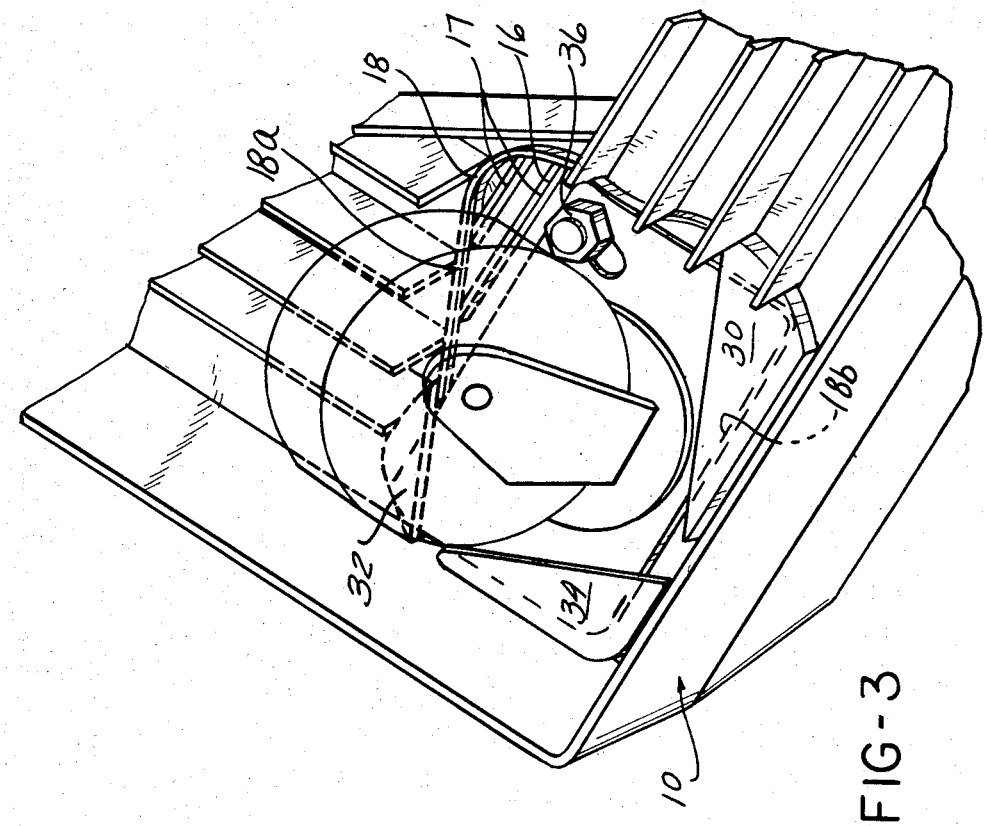
FIG. 3 is a perspective view of one corner of the frame, showing the mounting plate of a dolly in its assembled relationship with the frame.

Returning now particularly to FIG. 1, see also FIG. 3, the peripheral configuration of sidewall 18 is such that if the flat upper surface 24 of caster mounting plate 22 is placed in face-to-face engagement with the plate engaging surface 16 on the dolly frame, the plate may be rotated about a vertical axis between a position wherein its side edges extend parallel to the side edges of frame 10 and a second position wherein the side edges of plate 22 are inclined or nonparallel to the side edges of frame 10. Engagement of a side edge of mounting plate 22 with section 18a of sidewall 18 establishes the last-mentioned angular relationship of plate 22 relative to frame 10, while engagement of the opposite side edge of plate 22 with a section 18b of sidewall 18 establishes that angular orientation of plate 22 relative to frame 10 where its edges extend parallel to the sides of the dolly frame.

Fixedly secured to sidewalls 18 are three horizontal webs 30, 32 and 34 which project inwardly from the peripheral sidewall 18 to overlie portions of the plate-engaging surface 16. As best seen in the cross-sectional view of FIG. 2, the webs 30, 32 and 34 are horizontally spaced from plate-engaging surface 16 by a distance which is equal to or slightly greater than the thickness of mounting plate 22 of the caster. The inner edges 30a, 32a and 34a are, as best seen in FIG. 1, so located and oriented that a caster mounting plate 22 may be vertically moved into face-to-face engagement with plate-engaging surface 16 of the frame if the plate is oriented at the given angle relative to the sides of frame 10. When the flat surface 24 of plate 22 is so moved into engagement with surface 16, the plate may then be rotated about a vertical axis to the frame to move three corners of the plate into respective underlying engagement (see FIG. 2) with webs 30, 32 and 34 when the plate is rotated to the second angular orientation wherein its sides extend parallel to those of frame 10.

It is believed apparent that when so located, the webs 30, 32 and 34 will retain the plate against vertical separation from the plate-engaging surface 16, and the plate will remain assembled with frame 10 as long as it is in this last rotative orientation relative to frame 10.

To retain the plate in this last-mentioned orientation, a nut-and-bolt assembly 36 passes through a suitable opening 38 (FIG. 1) in frame 10 and through the slot 28 in mounting plate 22.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

I claim:

1. In a dolly including a unitary molded, horizontally disposed, load-supporting frame, a plurality of swiveling casters supporting said frame, and means on said frame for detachably mounting said casters in the underside of said frame, said casters each having a generally rectangular mounting plate with first, second, third and fourth corners and an upper surface lying in a horizontal general plane, said rectangular mounting plate further having a first opening adjacent said fourth corner;

the improvement when said mounting means comprises:

a plurality of flat, horizontal, downwardly facing mounting plate-engaging surfaces on the bottom of said frame, each plate-engaging surface having a second opening extending through said frame;

a peripheral sidewall integral with and projecting downwardly from the bottom of said frame and extending around each of said plate-engaging surfaces, each said peripheral sidewall being conformed to surround the periphery of said rectangular mounting plate when said upper surface of said rectangular mounting plate is inserted vertically upwards with its said upper surface in face-to-face engagement with said plate-engaging surface and to accommodate limited rotation of said rectangular mounting plate relative to said frame, while so engaged, about a vertical axis between first and second angular positions relative to said frame, said peripheral sidewall including a first wall having first and second straight wall segments defining an obtuse angle between said first and second straight wall segments, a second wall having a straight second wall segment and a curved second wall segment, said curved second wall segment connected to one end of said first straight wall segment, and straight second wall segment extending generally perpendicularly to the first straight wall segment of the first wall, a third wall having a straight third wall segment and a curved third wall segment, said curved third wall segment connected to said straight second wall segment, said straight third wall segment extending generally perpendicular to said straight second wall segment and generally opposing said first wall, a fourth wall having a straight fourth wall segment and a curved fourth wall segment, said curved fourth wall segment connected to said straight third wall segment and said straight fourth wall segment connected to said second straight wall segment of said first wall, said fourth wall generally opposing said second wall and having a greater length than said second wall;

first, second and third horizontally disposed thin webs integral with each said sidewall at spaced locations thereon and underlying respective portions of said plate-engaging surface and spaced from said plate-engaging surface by a distance at least equal to the thickness of said rectangular mounting plate, said webs being conformed to accommodate vertical, upward movement off said rectangular mounting plate into face-to-face relationship with said plate-engaging surface when said rectangular mounting plate is in said first angular position relative to said frame and to underlie and retain said rectangular mounting plate in face-to-face relationship with said plate-engaging surface when said rectangular mounting plate is located in said second angular position, said first opening in said rectangular mounting plate aligned with said second opening in said frame when said rectangular mounting plate is located in said second angular position, said first web having an outermost edge extending angularly from said first wall to a point generally adjacent the second wall transition from said straight second wall segment to said curved second wall segment, said outermost edge of said first web further disposed in generally linear relationship to said second straight wall segment of said first wall, said second web having an outermost edge angularly extending from said second wall to a point generally adjacent the third wall transition from said straight third wall segment to said curved third wall segment, said outermost edge of said second web being generally perpendicular to said outermost edge of said first web, and said third web having an outermost edge extending angularly from said third wall to said curved fourth wall segment, said outermost edge of said third web disposed generally parallel to the outermost edge of said first web and generally perpendicular to the outermost edge of said second web; and a bolt, including a head and a nut, mounted through said second opening in said frame and passing through said first opening adjacent said fourth corner of said rectangular mounting plate to maintain said rectangular mounting plate against rotation from said second angular position.

* * * * *